Figure 5:
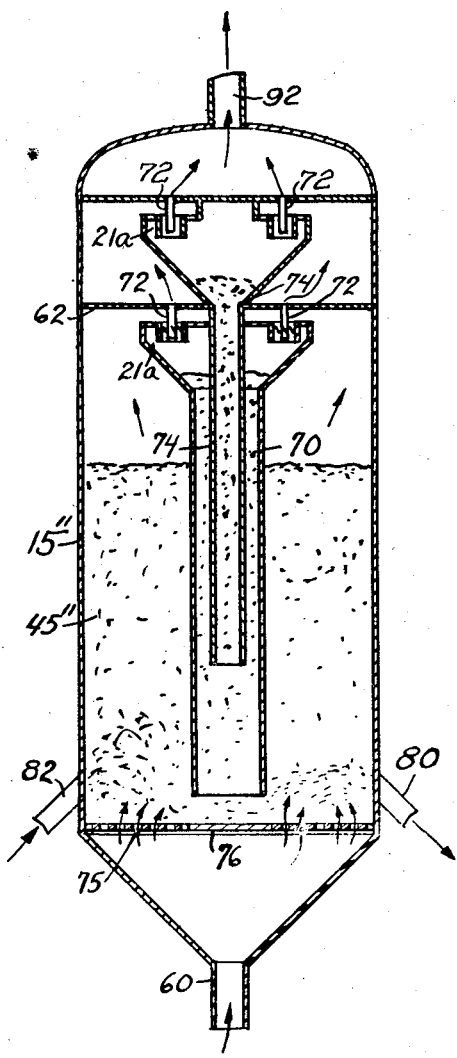

July 11, 1950

J. C. MUNDAY 2,515,155

APPARATUS FOR SEPARATING SOLIDS FROM GASES

Filed July 12, 1941

2 Sheets-Sheet 1

John C. Munday Inventor
By P. L. Young Attorney

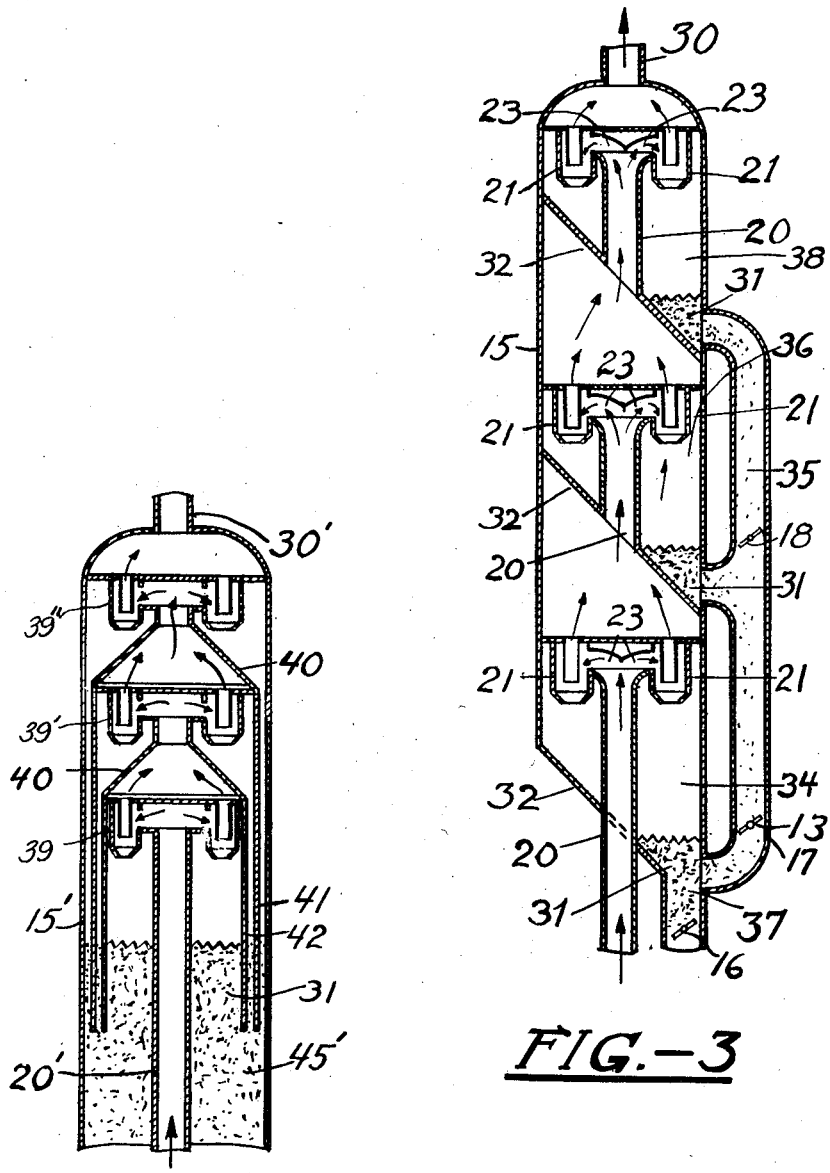

Patented July 11, 1950

2,515,155

UNITED STATES PATENT OFFICE 2,515,155

APPARATUS FOR SEPARATING SOLIDS FROM GASES

John C. Munday, Cranford, N. J., assignor to Standard Oil Development Company, a corporation of Delaware Application July 12, 1941, Serial No. 402,189

1 Claim. (Cl. 183—94)

The present invention relates to improvements in gas and solid separating devices and, more particularly, it relates to improvements in the construction and arrangement of a plurality of separating devices operating essentially on the centrifugal action method of separation in which the form and arrangement of the separating devices are such as to effect an economy in the construction thereof without lowering the efficiency of the installation or equipment.

In a great many commercial operations, it is necessary to separate a solid from a gas or vapor; for example, in the catalytic cracking of hydrocarbon oils where the operation is conducted in vapor phase with the catalyst suspended in the reaction vapors, of course the catalyst must be separated from the vapors following the completion of the catalytic treatment. Furthermore, the separation of catalyst, including fines, must be substantially complete because obviously the presence of a solid in say gasoline would be highly undesirable.

Prior to my invention, the general method employed for separating a powdered clay catalyst from hydrocarbon vapors in which it was suspended was to force the suspension through a plurality of separate cyclone separators and then through a Cottrell precipitator, the latter being employed to remove the extremely fine powdered catalyst not removed by the cyclone separators. While this method of separation has been regarded as generally satisfactory, the installation was cumbersome and expensive, and I have devised a separating device adapted to separate solids from gases efficiently, which device is characterized chiefly by its compactness, the ease and efficiency with which it may be operated, and the relatively low installation costs.

One object of the present invention is to provide suitable mechanical means for efficiently separating solids, more or less finely divided, from a gas or vapor in which they are suspended or entrained.

A more limited aspect of the present invention involves the employment of a plurality of cyclone separators disposed in one or more sets within a single shell by means of which I may effectively recover and separate solid material from a gas or vapor in which it is suspended, and collect the separated solid in a single reservoir.

As a corollary to the preceding object, it is a further object of the present invention to construct and arrange an assembly of cyclone separators within a single shell or separation zone in such a manner as to effect an economy of space and, at the same time, to secure satisfactory performance, whatever the particle size of the solid may be. It is a further object to provide an apparatus for the treatment of solids and gases wherein the solid is employed in a finely divided form and is separated from the gases after treatment and is returned to the treating zone.

Figure 1:
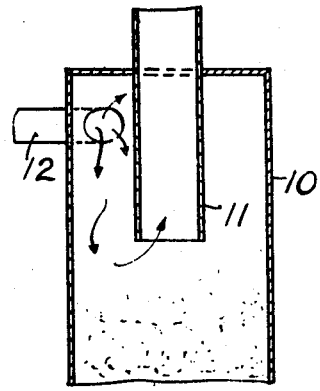
Figure 2:
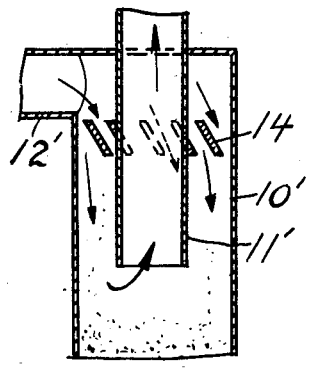

Referring to the drawings, I have shown several modifications as follows: Figs. 1 and 2 show each, diagrammatically, a separating device; Fig. 3 shows an arrangement of separators in a shell with means for feeding a suspension upwardly in the center and collecting the separated solid along the wall; Fig. 4 shows a more compact arrangement of separators; and Fig. 5 illustrates in detail another form and construction of the improved separating means and its use in a specific process for returning the separated material to a reaction zone.

Throughout the several views similar reference characters apply to similar parts.

Referring in detail to the drawings, Figs. 1 and 2 show enlarged views of two types of cyclone separators which may be employed in the present invention. The cyclone separator in Fig. 1 consists essentially of a casing 10, within which casing is disposed a conduit or pipe 11. The material to be separated, say a suspension of powdered catalyst and hydrocarbon, is fed into the cyclone separator through pipe 12 which discharges into the interior of casing 10. Centrifugal force is applied by introducing the suspension tangentially as shown in Fig. 1, or by means of vanes 14 as shown in Fig. 2. Due to the velocity of the suspension, the substantially concentric disposition of pipe 11, and the whirling action within the cyclone separator, the powdered material is thrown out of suspension by centrifugal action and falls or is forced toward the bottom of casing 10. Meanwhile, the gases freed from the solid pass upwardly through pipe 11 and therefore a separation is effected. In Fig. 2 the inlet pipe is 12', the casing is 10' and the outlet pipe is 11'.

Referring now to Fig. 3, the structure shown comprises a shell 15 and a feed pipe 20 containing the suspension of solid and gas which is caused to flow upwardly within the pipe. A plurality of spaced sets of cyclone separators 21 is contained in the shell at different levels; as shown, three sets may be employed. While for simplicity only two cyclone separators 21 are shown at each level in Fig. 3 the preferred arrangement is one in which six or eight cyclone separators at each level are disposed in a circle about feed pipe 20, each cyclone separator having a feed inlet 23. The suspension is passed in parallel through the individual cyclone separators at each level, and in series through the sets of cyclone separators. It will be observed that the suspension is passed upwardly through feed pipe 20; this insures equal distribution of solid to the individual cyclone separators in each level. The gases practically free of solid are withdrawn from shell 15 overhead through line 30 while the separated solid passes downward and is directed to collection zones 31 by means of baffles 32. It will be noted that the solid material recovered in the upper row gravitates through pipe 35 into common reservoir 37 as does the solid recovered in the intermediate row of cyclone separators. The manner employed in collecting the solid in the reservoir 37 is important to the successful operation of the equipment. A pressure drop occurs on passing the suspension through the cyclone separators. For this reason the pressure in zone 34 is higher than the pressure in zone 36, which in turn is higher than the pressure in zone 38. There is a tendency, therefore, for the suspension to by-pass the cyclone separators by flowing through pipe 35. In the present invention this tendency is overcome by utilizing the weight of the powdered solid in pipe 35 to counterbalance the difference in pressure between zone 34 and zone 36, and between zone 36 and zone 38. As shown, a level of powder is maintained in the collection zones 31 by manipulation of valves 16, 17 and 18 which may be butterfly or slide valves, or in any other suitable manner such as by means of level controllers. If desired, instead of employing a common pipe 35 as shown, separate pipes may be employed for conveying powder separated in the upper set of cyclone separators and in the intermediate set of cyclone separators, to the common reservoir 37. The powder is kept in the fluid state, if necessary by the injection of a small amount of fluidizing gas through lines not shown, and the head of powder in the collection zones 31 and in pipe 35 acts effectively as a seal between the sets of cyclone separators.

In the modification shown in Fig. 3 there are, as in Fig. 4, three sets of cyclone separators, but the circular arrangement of Fig. 3 permits a more compact structure and the casing 15 is not more restricted in its lower portion than in its upper portion. In Fig. 4 an inlet 20' is provided for entry of the suspension into the sets of cyclone separators 39, 39' and 39'' arranged at different levels. An outlet 30' is provided for vessel 15'. The recovered powder is guided by hoods 40 and concentric pipes 41 and 42 into the reservoir of powder 45' disposed in the lower portion of shell 15. It will be observed that the recovered powder is discharged into the reservoir below the level of powder therein, whereby the difference in pressure between the sets of cyclones is counterbalanced by the head of powder in the annular zones between pipes 41 and 42 and shell 15'. As mentioned above, a fluidizing gas may be employed in order to maintain the powder in a fluid state.

In the modification shown in Fig. 5 there is illustrated the use of the improved separating and collecting equipment in a specific process, namely, the conversion or treating of hydrocarbons. The process, for example, may be catalytic cracking, or the desulfurization or reforming of gasoline, or the dehydrogenation of petroleum gases. For illustrative purposes the apparatus will be described as used for the production of gasoline from higher boiling oils by cracking in the presence of a finely divided catalyst such as an acid-treated clay or a synthetic gel of silica-alumina or silica-magnesia. The apparatus comprises a shell 15'' which houses in its upper portion a set of cyclone separators or as shown a plurality of sets of cyclone separators 21a at different levels. As in the modification shown in Fig. 3, a reservoir of powder 45'' is maintained in the lower portion of shell 15'', but in this modification the suspension is passed upwardly outside the cyclones and separated catalyst is returned to the reservoir 45'' through inner concentric pipes 70 and 74. The reservoir 45'' is employed as a reaction zone as well as a reservoir for the powder. For example, the hydrocarbon feedstock introduced through pipe 60 is passed upwardly through the mass of catalytic powder at a rate which will provide the desired time of contact at the operating temperature and therefore the desired conversion. It will be appreciated that if the linear rate of flow of the vapors is too high the powdered catalyst will be blown out of the system. A suitable linear velocity is in the range of 1–5 feet/second when employing an activated clay catalyst having a free settling density of about 35–40 pounds per cubic foot and a particle size substantially in the range 200–400 mesh. The temperature, for example, may be in the range 750–1000° F. and the pressure may be in the range 0–100 pounds per square inch gage. As shown, a grate 75 may be employed at the bottom of the reaction zone to insure good distribution of feed vapors and a baffle 76 may be employed to deflect the vapors from pipes 70 and 74.

The suspension of vapors and catalyst leaving the reaction zone proper passes in an upward direction to the first set of cyclone separators 21a, and therefore excellent distribution of gas and of solid to the individual cyclone separators and equal velocities of the suspension passing therethrough are obtained. The suspension is deflected downwardly by header 62 into the cyclone separators. The bulk of the catalyst is caused to separate from the vapors by centrifugal force and is returned to the reactor-reservoir 45'' through pipe 70. The vapors which still contain some powder in suspension pass upwardly through outlets 72 and thence to the upper tier of cyclone separators 21a where a further quantity of powder is separated therefrom. The powder which is separated in the upper cyclone separators is returned to reservoir 45'' through pipe 74. As shown, pipe 74 is preferably smaller than the main return pipe 70 and concentric therewith. Whether pipe 74 discharges into pipe 70 as shown or directly into reservoir 45'' is not essential to the proper working of the system, although it might be mentioned that it is sometimes preferred to discharge the fine catalyst which is separated in the upper row of cyclone separators to the lower portion of reservoir 45'' and to discharge the coarser catalyst which is separated in the lower set of cyclone separators through pipe 70 into the upper portion of the reservoir. It is essential, however, that pipe 70 extend beneath the level of the catalyst powder in reservoir 45'', and that pipe 74 extend beneath the level of powder in pipe 70, preferably to a point lower than the level in reservoir 45''. The resulting head of fluidized powder in pipes 70 and 74 prevents the suspension from by-passing the cyclone separators. As mentioned earlier, a fluidizing gas such as steam may be injected into the discharge pipes in order to keep the powder in a free-flowing condition.

The vapors substantially free of powder are removed from the system through line 92 and are passed to suitable fractionating and refining equipment.

During the cracking step carbonaceous deposits are formed on the catalyst which necessitates its regeneration. This may be accomplished by subjecting the catalyst to treatment with an oxidizing gas such as air. For example, catalyst may be withdrawn from the reactor-reservoir 45" through line 80 and passed to a regeneration unit not shown, the construction of which may be similar to that of the reactor unit just described, where carbonaceous deposits are burned off the catalyst by the oxygen in air. Regenerated catalyst is returned to the reactor unit through line 82. If desired, heat of regeneration can be carried by the catalyst to the reactor where it is utilized for heating or even vaporizing the feedstock.

It will be understood that in the operation of the apparatus shown in Fig. 5 wherein the vapors bubble up through the powder mass, there is a continuous churning action which more or less thoroughly mixes regenerated catalyst and used catalyst, so that the portion which is withdrawn and passed to the regenerator is represenative of the contents of the reactor. For this reason, unless the reactor is especially constructed to prevent eddying, it makes not a great deal of difference from which point catalyst is withdrawn and at which point regenerated catalyst is returned. It is preferred to withdraw the catalyst through line 80 in a rather dense condition, and it may be returned as such through line 82.

Mention has been made above of the level of powder which is maintained in reservoir 45". The level may be rather diffused when employing relatively high linear gas velocities such as 2–5 feet/second through the powder. The catalyst in the lower part of the casing 15" is of considerably greater density than that in the intermediate part of the casing. These two conditions of the catalyst are usually referred to as the dense phase and the suspension phase. The change from the dense phase to the suspension phase may be spread over a height of one or two feet. In such cases it is desirable that the suspension be passed upwardly for a distance of at least four feet above the level of the dense phase in an unobstructed manner in order that turbulence may subside and the concentration of powder in the different portions of the suspension in the zone of the separators may be equalized before the suspension stream subdivides and enters the individual cyclone separators. This has the effect of carrying over substantially less powder to the cyclones.

In this or any of the preceding modifications, it is within the scope of my invention to provide at the level of each assembly of cyclone separators two or more sets of cyclone separators, that is to say, considering the upper assembly or concentrically disposed set of cyclone separators instead of having a single set as shown, two or more concentric sets of cyclone separators may be provided.

To recapitulate, the present invention consists essentially in housing a plurality of cyclone separators within a single shell to form a compact separation unit in which dust or powder or any other solid divided material may be efficiently separated from a gas. The advantage of my process resides in the fact that I effect an economy in space and construction without sacrificing efficiency of operation. In general, I provide a plurality of spaced cyclone separators concentrically disposed about the axis of a shell or other suitable housing means, the said cyclone separators of the same unit being disposed in substantially the same plane. In order to increase the capacity of the separation unit, I may provide a plurality of cyclone separators at different vertical levels, and I may further provide a plurality of sets of cyclone separators in the same horizontal level or plane.

Numerous modifications of my invention will readily suggest themselves to those familiar with this particular art.

What I claim is:

An apparatus for separating solids from gases, comprising a vertical shell, a plurality of vertically spaced sets of separators within said shell, each set containing laterally spaced separators disposed in substantially the same plane, means for directing an upflowing suspension of a solid in a gasiform material into the separators, vertical pipes within said shell in communication with the separators for conveying, in a downward direction, solid separated from the gasiform material, said pipes being concentrically disposed and of sufficient length to extend from an upper set of separators to a point below the next lower set of separators, to discharge solid from each set of separators into solid from the next lower set, thus effecting a seal against escape of gas through said vertical pipes.

JOHN C. MUNDAY.

REFERENCES CITED

The following references are of record in the file of this patent:

UNITED STATES PATENTS

| Number | Name | Date |
|---|---|---|
| 1,380,698 | Anspach et al. | June 7, 1921 |
| 1,416,995 | Stroud | May 23, 1922 |
| 1,818,905 | McGee | Aug. 11, 1931 |
| 1,940,196 | Wagner | Dec. 19, 1933 |
| 1,980,522 | Hawley | Nov. 13, 1934 |
| 2,205,966 | Van Tongeren | June 25, 1940 |
| 2,230,453 | Fitch | Feb. 4, 1941 |
| 2,337,684 | Scheineman | Dec. 28, 1943 |
| 2,357,901 | Lewis et al. | Sept. 12, 1944 |
| 2,451,803 | Campbell et al. | Oct. 19, 1948 |

FOREIGN PATENTS

| Number | Country | Date |
|---|---|---|
| 642,547 | Germany | Mar. 8, 1937 |